C. O. ANDERSON.
CREAM SEPARATOR BOWL.
APPLICATION FILED APR. 13, 1918.

1,351,198.

Patented Aug. 31, 1920.
2 SHEETS—SHEET 1.

Witness:
Fed. C. Davison

Inventor
Carl Oscar Anderson
By Bunnell, Geist & Warden
Attys.

C. O. ANDERSON.
CREAM SEPARATOR BOWL.
APPLICATION FILED APR. 13, 1918.
1,351,198.
Patented Aug. 31, 1920.
2 SHEETS—SHEET 2.
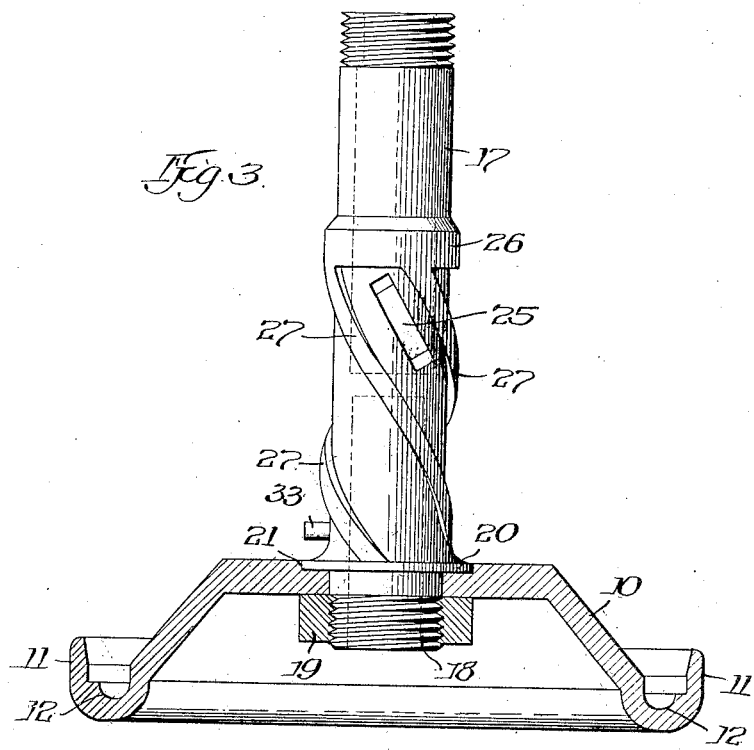
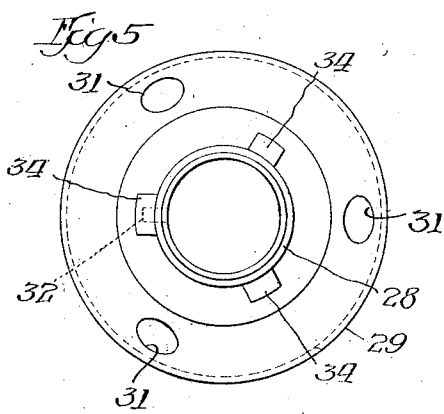
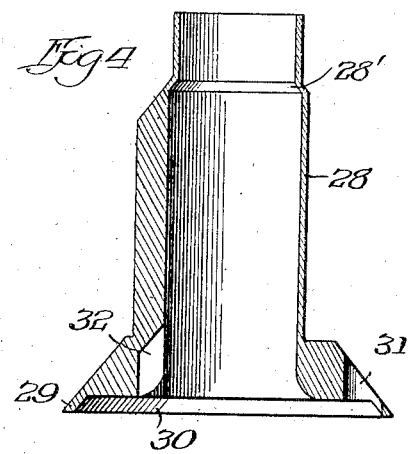
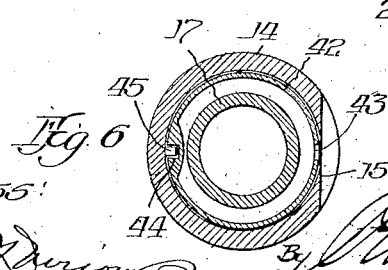
Inventor
Carl Oscar Anderson

UNITED STATES PATENT OFFICE.

CARL OSCAR ANDERSON, OF SPRINGFIELD, ILLINOIS, ASSIGNOR, BY MESNE ASSIGNMENTS, TO THORNE BROTHERS, INCORPORATED, OF CHICAGO, ILLINOIS, A CORPORATION OF ILLINOIS.

CREAM-SEPARATOR BOWL.

1,351,198.

Specification of Letters Patent. Patented Aug. 31, 1920.

Application filed April 13, 1918. Serial No. 228,302.

*To all whom it may concern:*

Be it known that I, CARL OSCAR ANDERSON, a citizen of the United States, residing at Springfield, in the county of Sangamon and State of Illinois, have invented certain new and useful Improvements in Cream-Separator Bowls, of which the following is a specification.

The present invention has relation to centrifugal liquid separators, more especially for the separation of cream from milk, and is particularly concerned with the separating bowls thereof.

The invention has as one of its objects the provision of a novel form of bowl in which the space occupied by the feeding instrumentalities for introducing the whole milk is reduced to a minimum, thereby increasing the separating space, and obtaining maximum separating efficiency in the operation of the bowl.

Furthermore, the invention also seeks to provide a separating bowl in which the diameter of milk inflow is reduced to the smallest degree practicable without the formation of tortuous passages or channels for the cream to pass through after being separated. Churning and injuring of the cream is thus avoided; the bowl may be easily cleansed and its cleanly condition preserved, and the highest sanitary conditions thereby promoted.

A further object of the invention is the provision of highly efficient means for supporting the liner or separating disks, whereby to insure their proper alinement and maintenance of their relative positions.

Having these general objects in view, and others which will appear as the nature of the improvements is better understood, the invention consists substantially in the novel construction, combination and arrangement of parts hereinafter fully described, illustrated in the accompanying drawings and finally pointed out in the appended claims. It is to be understood, however, that the form of the invention herein shown and described is not to be taken in a restricted sense, the same being only an illustrative adaptation of the invention which is susceptible to change, modification and variation.

In the accompanying drawings—

Fig. 3 is a transverse sectional view of the bowl base, the inlet tube being shown in elevation;

Fig. 4 is a transverse sectional view of the milk distributing sleeve;

Fig. 5 is a top plan view thereof; and

Fig. 6 is a sectional plan view through the neck of the bowl and the assembled parts, as on the line 6—6 of Fig. 1.

Figure 1:
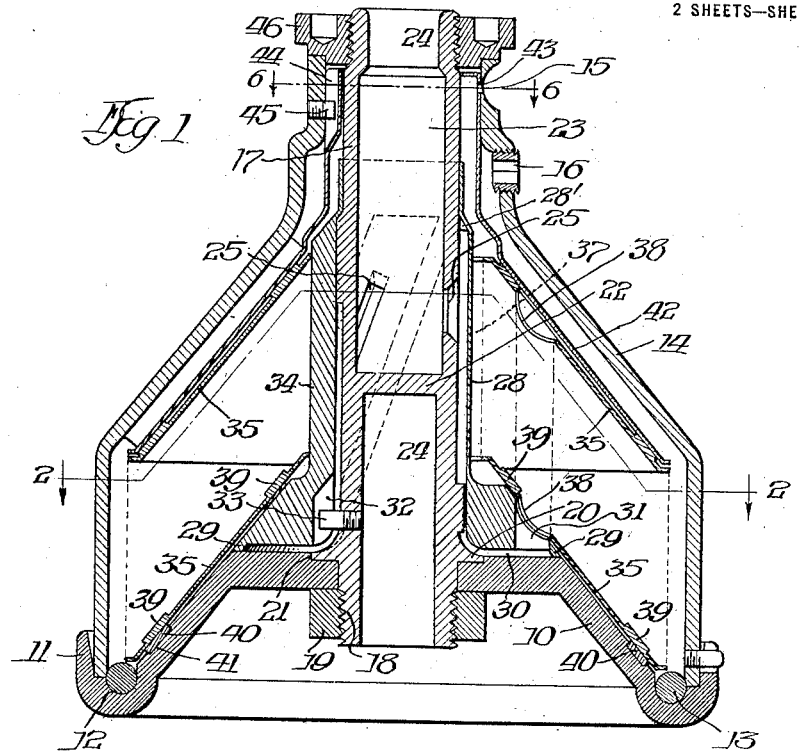
Figure 1 is a vertical transverse sectional view of a liquid separating bowl embodying the herein described improvements.
Figure 2:
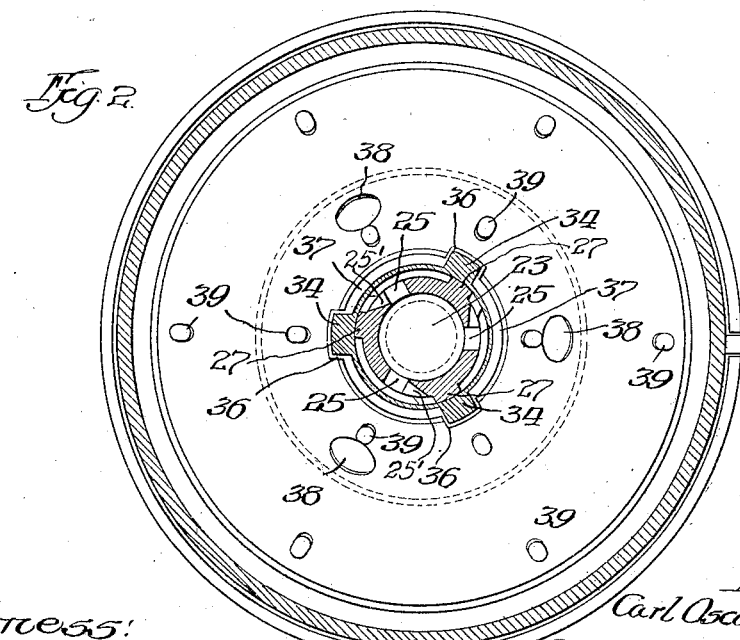
Fig. 2 is a sectional plan view thereof on the line 2—2 of Fig. 1.

Referring now in detail to the drawings, the numeral 10 designates the base of a cream separating bowl, which is substantially frusto-conical in cross section, in accordance with the modern practice followed in the construction of centrifugal liquid separators. This base is provided with a marginal upstanding flange 11 adjacent to which is a circumferential groove 12 which receives the usual packing gasket 13 for effecting a tight joint at this point.

Associated with the base 10 is the casing or shell 14 of the bowl. This is also frusto-conical and is provided with a cream outlet 15 and a skim milk outlet 16. The latter is in the form of a regulating screw as is commonly employed.

Rising from the central portion of the base 10 is an inlet tube 17, the lower end of which passes through a centrally disposed opening in said base 10 and is provided with screw threads 18 to which a fastening nut 19 is applied. The tube 17 is also provided with a base flange 20, which flange is seated in a depression or recess 21 formed in the upper surface of the base 10 and by reason of this construction, and the employment of the fastening nut 19 at the under side of the base 10, the inlet tube 17 is firmly held in rigid relation to said base 10.

Within the inlet tube 17, and located at a point substantially midway between its ends, is a horizontal partition 22. This divides the interior of said tube 17 into an upper milk receiving chamber 23, into which the whole milk is introduced through an inlet 24 at the top of the tube 17, while a spindle-receiving chamber 24 is formed in the lower portion of the tube 17. The chamber 24 accommodates the upper end of the usual driving spindle, which it is not deemed necessary to illustrate herein, any preferred form of means for connecting the spindle with the bowl also being received by the chamber 24.

The sides of the receiving chamber 23, adjacent to the partition 22, are provided with feed ports 25 through which the whole milk may be readily discharged from the receiving chamber 23. At the exterior of the inlet tube 17, and at a point above the feed ports 25, an annular rib 26 is provided, and extending downwardly from said rib 26 to the flange 20 at the base of the tube 17 is a plurality of spiral ribs 27. The spaces between these ribs constitute channels for the downflow of the whole milk as the same leaves the feed ports 25 in the manner hereinafter described. In this connection it will be noted that the feed ports 25 are inclined at an angle to the vertical axis of the tube 17 in order to conform to the spiral formation of the spaces between the ribs 27, and the rear walls of said ports 25, with respect to the direction of rotation of the bowl, are cut away on tangential lines, as at 25', for the purpose of increasing the difference of the lineal velocity in the flow of the milk between the inlet ends of the spiral passages and the ribs 27. This assists in creating maximum pressure on the milk as it flows through said spiral passages as will presently appear.

Surrounding the inlet tube 17 is a milk distributer sleeve 28. The bore of this sleeve is slightly contracted at its upper end in order to fit snugly against the tube 17 above the annular rib 26, the milk distributer sleeve having a beveled seat 28' at the base of this reduced portion of its bore, which seat rests upon the beveled upper surface of the rib 26. The remainder of the bore of the sleeve 28 from the seat 28' to the lower end of the sleeve receives the spiral ribs 27 of the tube 17, and fits snugly against the outer surfaces of the ribs. Hence, the sleeve 28 provides an outer wall for the spaces between the spiral ribs 27, so that the whole milk entering each of said spaces from the particular port 25 in communication with that space will be precluded from mixing with the milk in the other spaces between the other spiral ribs as the milk passes downwardly from the receiving chamber 23. The lower end of the milk distributer sleeve 28 is provided with a base flange 29 which forms a collecting chamber 30 at the lower end of the sleeve 28, and it will be observed that this lower end of the base is enlarged and is provided with a plurality of vertically disposed openings 31, the purpose of which will presently appear. At one side of the lower end of the bore of the sleeve 28 a notch 32 is also provided, said notch receiving a centering pin 33 carried by the inlet tube 17 adjacent to its lower end. In applying the distributer sleeve 28 to the inlet tube 17 the notch 32 is caused to register with the pin 33, which projects horizontally from the side of the tube 17, and when so engaged the milk distributer sleeve 28 is precluded from rotating with respect to the inlet tube 17.

At the exterior the milk distributer sleeve 28 is provided with a plurality of vertically extending ribs 34, said ribs rising upwardly from the base of said sleeve and terminating at a point adjacent to the upper end of the sleeve. The usual liner or separator disks 35 surround the distributer tube 28, each of said disks being provided with a plurality of radially extending notches 36 which are designed to receive the ribs 34 when the disks are positioned on the sleeve 28. The notches 36 are formed in the edges of the central openings of the disks 35, the diameter of these openings being slightly greater than the diameter of the sleeve 28. Cream passages 37 are thus provided between the ribs 34, and as the cream is separated from the milk it is permitted to rise in a vertical line to the cream outlet 15 without the necessity of passing through tortuous passages. The disks 35 are also provided with a plurality of milk-circulating openings 38, which openings, in the assembled relation of the disks, provide vertical passages for the upward flow of the whole milk from the collecting chamber 30 at the base of the distributer sleeve 28. By providing the notches 36 for receiving the ribs 34 the disks 35 are prevented rotating, and the openings 38 thereof are held in alinement so that the milk may readily rise therethrough and be distributed between the several disks in the usual manner. To provide for separation of the several disks 35, and thereby form the requisite circulating spaces therebetween, each of said disks is provided with a plurality of spacing buttons 39. That the lowermost disk may be properly spaced above the base 10 the latter is also provided with a plurality of spacing buttons 40 which are seated in suitable recesses 41 formed in the base 10. When the recesses 41 are formed, which may be done by boring, the buttons 40 are driven tightly into the same, the buttons projecting slightly above the upper surface of the base 10, and thereby enabling the milk to circulate between the base and the lowermost disk 35 when the latter is assembled on the distributer sleeve 28.

It has not been deemed necessary to illustrate the entire series of liner disks 35, the dotted lines indicating the omitted disks.

The usual cream cone 42 is arranged over the disks 35 the neck thereof extending into the neck of the shell or casing 14 and having the usual opening 43 to register with the cream outlet 15. The neck of the cream cone 42 is also provided with a vertically disposed depression 44 for receiving a guide pin 45, whereby to hold the cream cone in proper position within the shell.

The usual clamping nut 46 is also screw-threaded to the upper end of the inlet tube 17 for engagement with the upper end of the shell or casing 14, whereby to hold the latter on the base 10, and thus maintain the several parts in proper operative position.

With the parts assembled as illustrated in Fig. 1, it will be understood that the whole milk is introduced to the receiving chamber 23 through the inlet 24. It passes out through the feed ports 25 into the spaces between the spiral ribs 27, which spaces are closed by the distributer sleeve 28. The spiral ribs 27 are inclined rearwardly and downwardly with reference to the direction of rotation of the bowl. As the milk enters the spiral passages from the ports 25 the milk is pressed downwardly by the ribs 27, by reason of the milk then having a less velocity than the bowl. Because of this pressure on the inflowing milk, and the comparatively wide space between the ribs 27, the passages which are formed between the sleeve 28 and the inlet tube 17 can be comparatively thin or narrow and at the same time allow the required amount of milk to pass. By this arrangement the diameter of the milk inflow is reduced to the smallest degree practicable; the structure is freed of tortuous passages or channels for the cream after separation, and churning and injuring of the cream is thus avoided. By the construction described the space occupied by the feeding instrumentalities for introducing the whole milk is reduced to a minimum, so that the separating space is increased and maximum separating efficiency in the operation of the bowl is obtained.

As the milk leaves the spaces between the ribs 27 it enters the collecting chamber 30 at the base of the sleeve 28 whence it is permitted to rise through the openings 31, and the alined openings 38 of the superimposed liner disks 35. It then enters the spaces between these disks 35, the cream rising through the channels 37 and being discharged through the outlet 15, while the skim milk passes outwardly to the shell or casing 14 and rises along the same, passing between the cream cone 42 and the shell or casing and being discharged through the outlet 16.

The construction described may be easily cleansed and its cleanly condition preserved and by reason of the relation of the distributer sleeve 28 to the ribs 27 the proper alinement and maintenance of the relative positions of the separating disks is insured.

I claim:

1. In a separator bowl of the class described including a base, a shell associated therewith, and means for holding the same in assembled relation, the combination with an inlet tube carried by said base, said tube having a milk-receiving chamber and a plurality of feed ports communicating therewith, and also provided at its exterior with a series of milk distributing channels into which said ports discharge, of a distributer sleeve surrounding said inlet tube and forming the outer wall of said distributing chanels, whereby to direct the flow of the whole milk to the lower portion of the bowl, and a liner surrounding said distributer sleeve and provided with distributing channels in communication with the distributing channels of the inlet tube.

2. In a separator bowl of the class described including a base, a shell associated therewith, and means for holding the same in assembled relation, the combination with an inlet tube carried by said base, said tube having a milk-receiving chamber and a plurality of feed ports communicating therewith, and also provided at its exterior with a series of milk distributing channels into which said ports discharge, of a distributer sleeve surrounding said inlet tube and forming the outer wall of said distributing chanels, whereby to direct the flow of the whole milk to the lower portion of the bowl, the lower portion of said distributer sleeve having a collecting chamber formed therein and in communication with said distributing channels of the inlet tube, and a liner surrounding said distributing sleeve and provided with distributing channels in communication with the collecting chamber of said distributer sleeve.

3. In a separator bowl of the class described including a base, a shell associated therewith, and means for holding the same in assembled relation, the combination with an inlet tube carried by said base, said tube having a milk-receiving chamber and a plurality of feed ports communicating therewith, and also provided at its exterior with a series of milk distributing channels into which said ports discharge, of a distributer sleeve surrounding said inlet tube and forming the outer wall of said distributing chanels, whereby to direct the flow of the whole milk to the lower portion of the bowl, the lower portion of said distributing sleeve being provided with a collecting chamber communicating with the distributing channels at the exterior of the inlet tube, said distributer sleeve also being provided with a series of openings in communication with said collecting chamber for delivering the whole milk from the latter, and a liner surrounding said distributer sleeve and provided with a plurality of distributing channels in communication with said openings of the distributer sleeve.

4. In a separator bowl of the class described including a base, a shell associated therewith, and means for holding the same in assembled relation, the combination with an inlet tube carried by said base, said tube having a milk-receiving chamber and a plurality of feed ports communicating therewith, and also provided at its exterior with a series of milk-distributing channels into which said ports discharge, of a distributer sleeve surrounding said inlet tube and forming the outer wall of said distributing channels, whereby to direct the flow of the whole milk to the lower portion of the bowl, the lower end of said distributer sleeve being enlarged and provided with a depression at its under face which coöperates with the base of the bowl to provide a milk collecting chamber, said chamber being in communication with the distributing channels of the inlet tube, and a liner surrounding said distributing sleeve and provided with distributing channels in communication with the milk collecting chamber.

5. In a separator bowl of the class described including a base, a shell associated therewith, and means for holding the same in assembled relation, the combination with an inlet tube carried by said base, said tube having a milk-receiving chamber and a plurality of feed ports communicating therewith, and also provided at its exterior with a series of milk-distributing channels into which said ports discharge, of a distributer sleeve surrounding said inlet tube and forming the outer wall of said distributing channels, whereby to direct the flow of the whole milk to the lower portion of the bowl, the lower portion of said distributer sleeve being enlarged and provided at its under face with a depression which coöperates with the base of the bowl to provide a milk collecting chamber in communication with the distributing channels of said inlet tube, the lower end of said distributer sleeve being also provided with a plurality of openings in communication with said milk collecting chamber for delivery of milk from the latter, and a liner surrounding said distributer sleeve and provided with distributing channels in communication with the openings at the lower end of said distributer sleeve.

6. In a separator bowl of the class described including a base, a shell associated therewith, and means for holding the same in assembled relation, the combination with an inlet tube carried by said base, said tube having a milk-receiving chamber and a plurality of feed ports communicating therewith, and a plurality of ribs arranged at the exterior of said inlet tube and spaced apart to provide a series of milk distributing channels in communication with said feed ports, of a distributer sleeve surrounding said inlet tube and fitting against said ribs, said sleeve forming the outer wall of the distributing channels between said ribs, whereby to direct the flow of the whole milk to the lower portion of the bowl, and a liner surrounding said distributer sleeve and provided with distributing channels in communication with the distributing channels of the inlet tube.

7. In a separator bowl of the class described including a base, a shell associated therewith, and means for holding the same in assembled relation, the combination with an inlet tube carried by said base, said tube having a milk-receiving chamber and a plurality of feed ports communicating therewith, and a plurality of ribs arranged at the exterior of said inlet tube and spaced apart to provide a series of milk distributing channels with which said ports communicate, of a distributer sleeve surrounding said inlet tube and fitted upon said ribs, said sleeve forming the outer wall of said distributing channels, whereby to direct the flow of the whole milk to the lower portion of the bowl, the lower portion of said distributer sleeve having a collecting chamber in communication with said distributing channels, and a liner surrounding said distributer sleeve and provided with distributing channels in communication with said milk collecting chamber.

8. In a separator bowl of the class described including a base, a shell associated therewith, and means for holding the same in assembled relation, the combination with an inlet tube carried by said base, said tube having a milk-receiving chamber and a plurality of feed ports communicating therewith, and a series of spirally-arranged ribs located at the exterior of said inlet tube and spaced apart to provide a series of spiral milk-distributing channels into which said ports discharge, of a distributer sleeve surrounding said inlet tube and seated against said spiral ribs, said sleeve forming the outer wall of said distributing channels, whereby to direct the flow of the whole milk to the lower portion of the bowl, and a liner surrounding said distributer sleeve and provided with distributing channels of the inlet tube.

9. In a separator bowl of the class described including a base, a shell associated therewith, and means for holding the same in assembled relation, the combination with an inlet tube carried by said base, said tube having a milk-receiving chamber and a plurality of feed ports communicating therewith, a rib formed at the exterior of said inlet tube above said feed ports, and a plurality of spiral ribs extending downwardly from said rib to the lower portion of the inlet tube and spaced apart to provide a series of spiral milk-distributing channels into which the feed ports discharge, of a distributer sleeve surrounding said inlet tube and seated upon the first mentioned rib, said distributer sleeve also being seated upon said spiral ribs and forming the outer wall of said spiral distributing channels, whereby to direct the flow of the whole milk to the lower portion of the bowl, and a liner surrounding said distributer sleeve and provided with distributing channels in communication with the distributing channels of the inlet tube.

10. In a separator bowl of the class described, the combination with the base, and its shell, of an inlet for the whole milk, and means surrounding said inlet and in communication with the separating space of the bowl for exerting pressure on the incoming milk induced by rotation of the bowl, whereby to force the milk to the separating space of the bowl.

11. In a separator bowl of the class described, the combination with the base, and its shell, of an inlet for the whole milk located at an elevated point within the bowl, and means surrounding said inlet and extending therefrom to the separating space of the bowl for exerting pressure on the incoming milk induced by rotation of the bowl to force the milk to the separating space.

12. In a separator bowl of the class described, the combination with the base, and its shell, of an inlet for the whole milk, the bowl being provided with a spiral distributing channel extending from said inlet to the separating space of the bowl, whereby the incoming milk is subjected to pressure induced by rotation of the bowl for forcing the milk to the separating space of the bowl.

13. In a separator bowl of the class described, the combination with the base, and its shell, of an inlet for the whole milk, said inlet being provided with a plurality of feed ports, a series of spiral ribs associated with said inlet and extending downwardly and rearwardly from said feed ports with respect to the direction of rotation of the bowl, whereby to exert pressure on the incoming milk induced by rotation of the bowl to force the milk to the separating space of the bowl and a sleeve coöperating with said ribs to close the spaces therebetween and provide downwardly extending passages for the whole milk to control direction of flow of the incoming milk.

14. In a separator bowl of the class described, the combination with the base, and its shell, of an inlet for the whole milk, said inlet being provided with a plurality of feed ports the rear walls of which with respect to the direction of rotation of the bowl are cut away on tangential lines, a series of spiral ribs associated with said inlet and extending downwardly and rearwardly from said feed ports with respect to the direction of the bowl, whereby to exert pressure on the incoming milk induced by rotation of the bowl to force the milk to the separating space of the bowl, and a sleeve coöperating with said ribs to close the space therebetween and provide downwardly extending passages for the whole milk to control direction of flow of the incoming milk.

15. In a separator bowl of the class described, the combination with the base, and its shell, of an inlet for the whole milk, and a plurality of liner disks arranged in the bowl and separated from each other to provide spaces for circulation of the milk and the separated constituents thereof, the base of the bowl being provided with a series of recesses, and a plurality of separator buttons seated in said recesses and frictionally held therein for holding the lowermost disk in separated relation to said base.

In testimony whereof I have hereunto signed my name in the presence of two subscribing witnesses.

CARL OSCAR ANDERSON.

Witnesses:
EDWARD E. DE TREITAS,
W. A. LYMAN.